Aug. 14, 1951     H. E. SLOAN ET AL     2,563,970
POWER-DRIVEN CHUCK-OPERATING MEANS FOR
LATHES AND OTHER MACHINES
Filed July 27, 1950     10 Sheets-Sheet 1
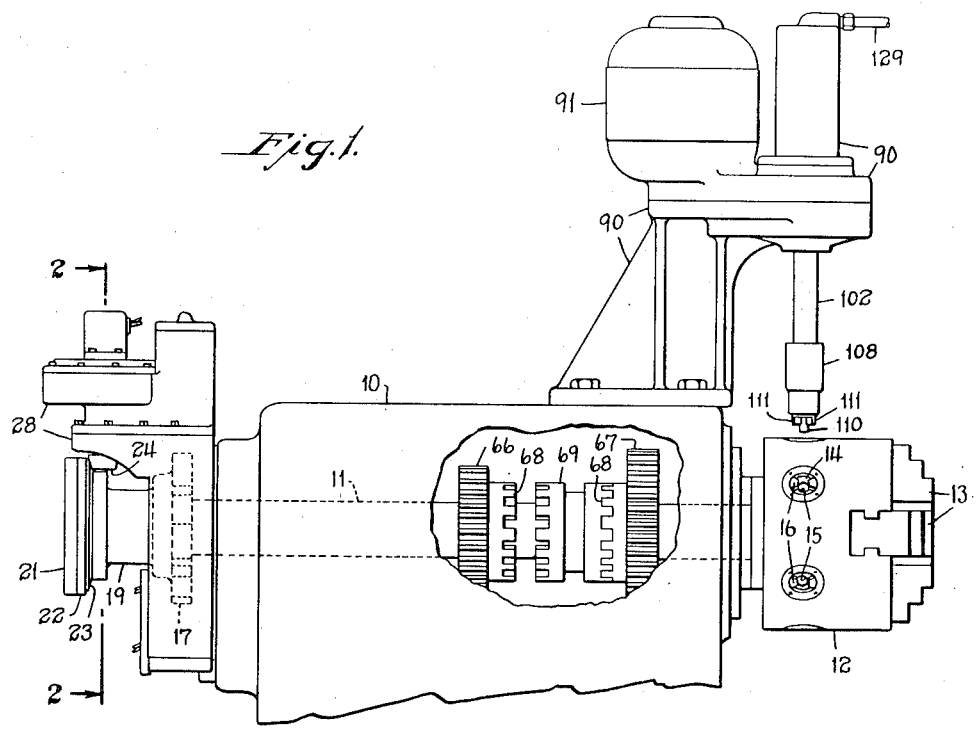
Fig. 1.
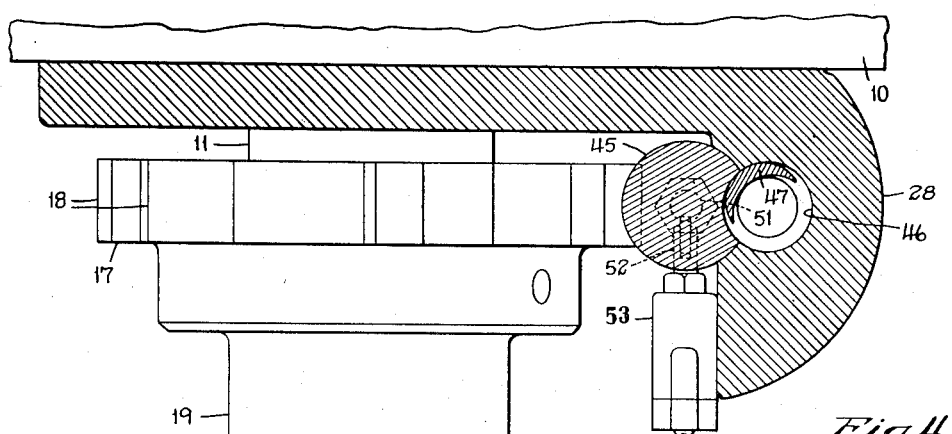
Fig. 4.
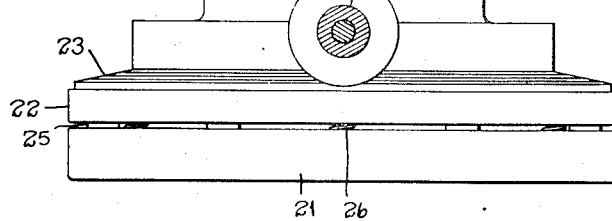
Harry E. Sloan
Harry E. Sloan, Jr.
Linwood B. Swanson
Inventors
By Seymour, Earle & Nichols
Attorneys

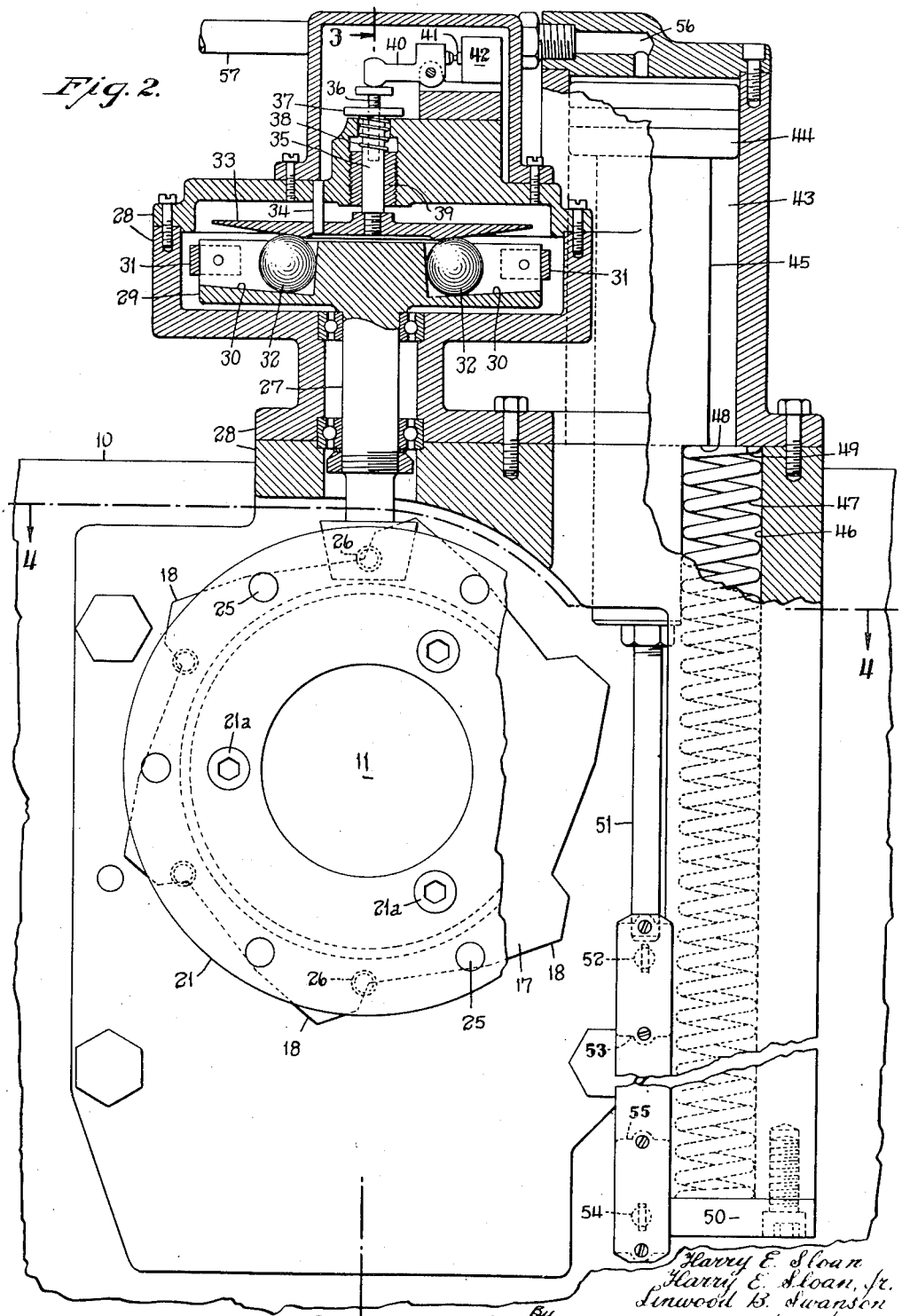

Aug. 14, 1951 H. E. SLOAN ET AL 2,563,970
POWER-DRIVEN CHUCK-OPERATING MEANS FOR
LATHES AND OTHER MACHINES
Filed July 27, 1950 10 Sheets-Sheet 3

Harry E. Sloan
Harry E. Sloan, Jr.
Linwood B. Swanson
Inventors
by Seymour, Earle & Nichols
Attorneys

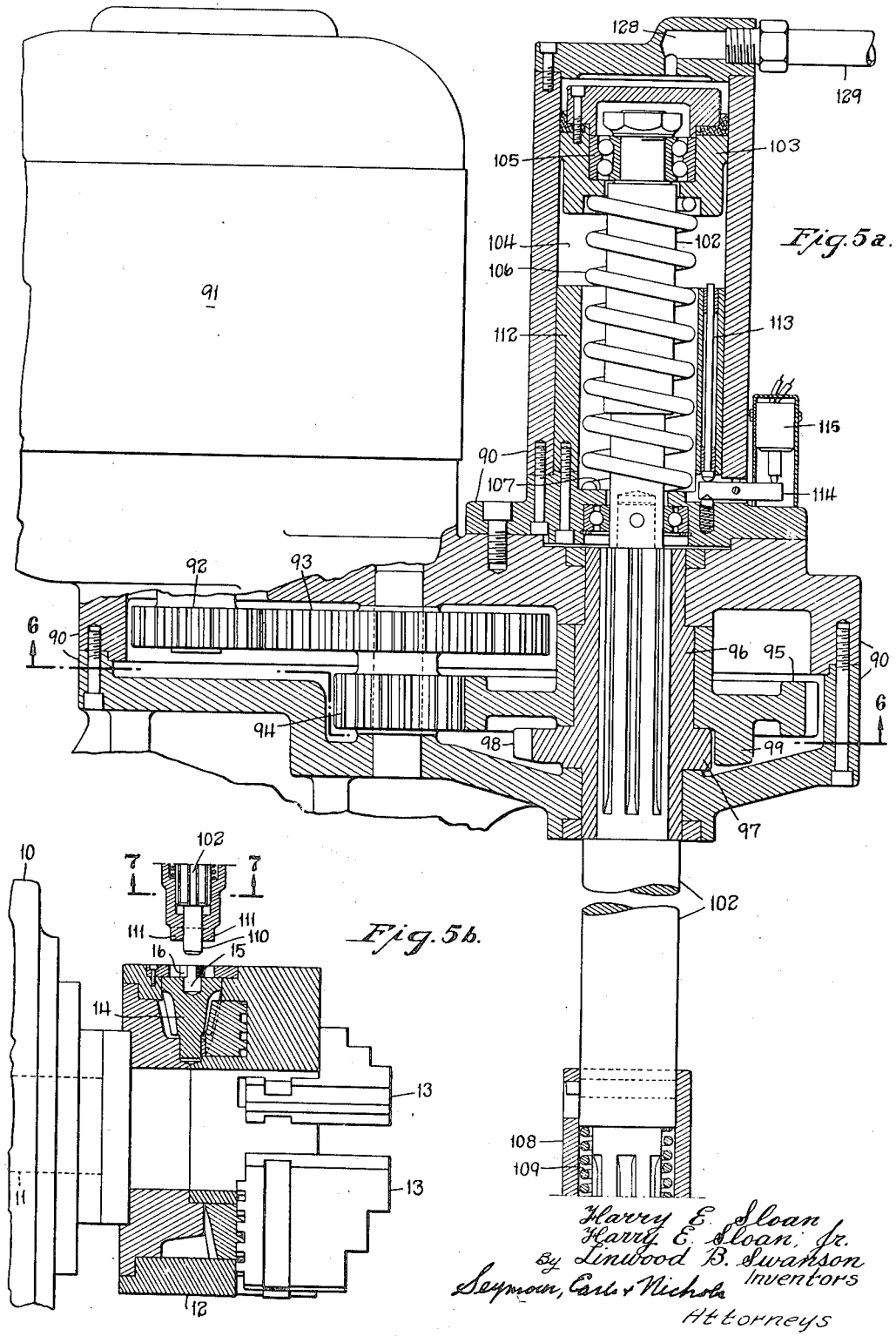

Aug. 14, 1951  H. E. SLOAN ET AL  2,563,970
POWER-DRIVEN CHUCK-OPERATING MEANS FOR
LATHES AND OTHER MACHINES
Filed July 27, 1950  10 Sheets-Sheet 5
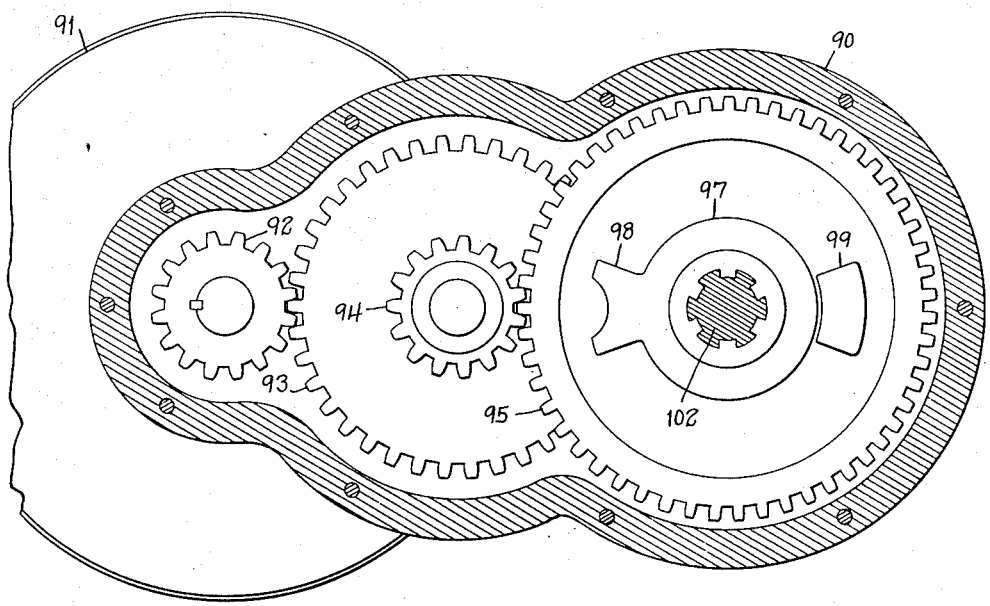
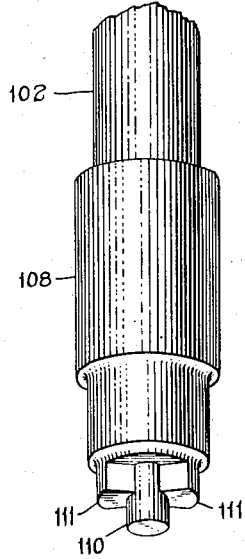
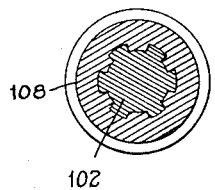

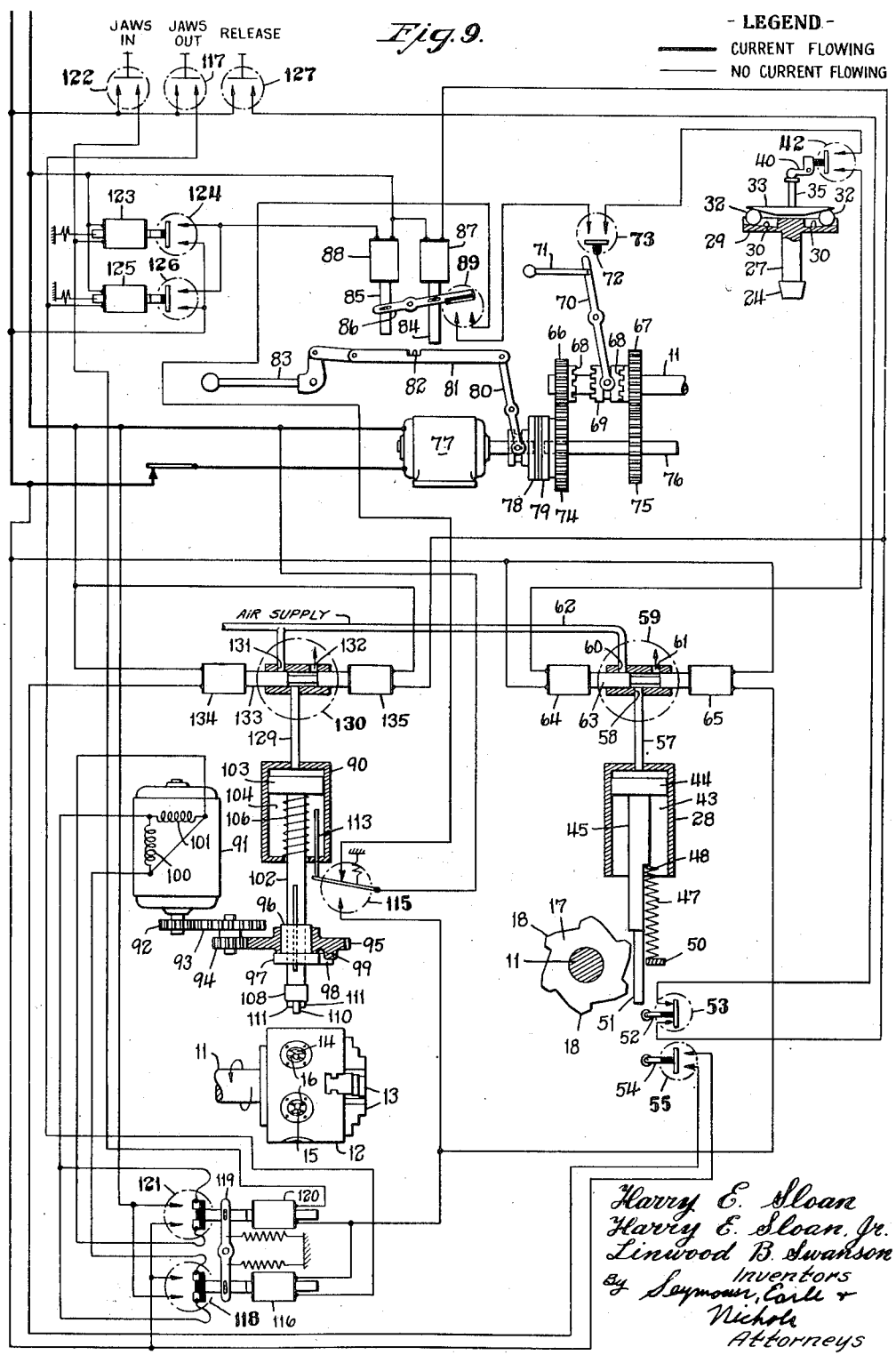

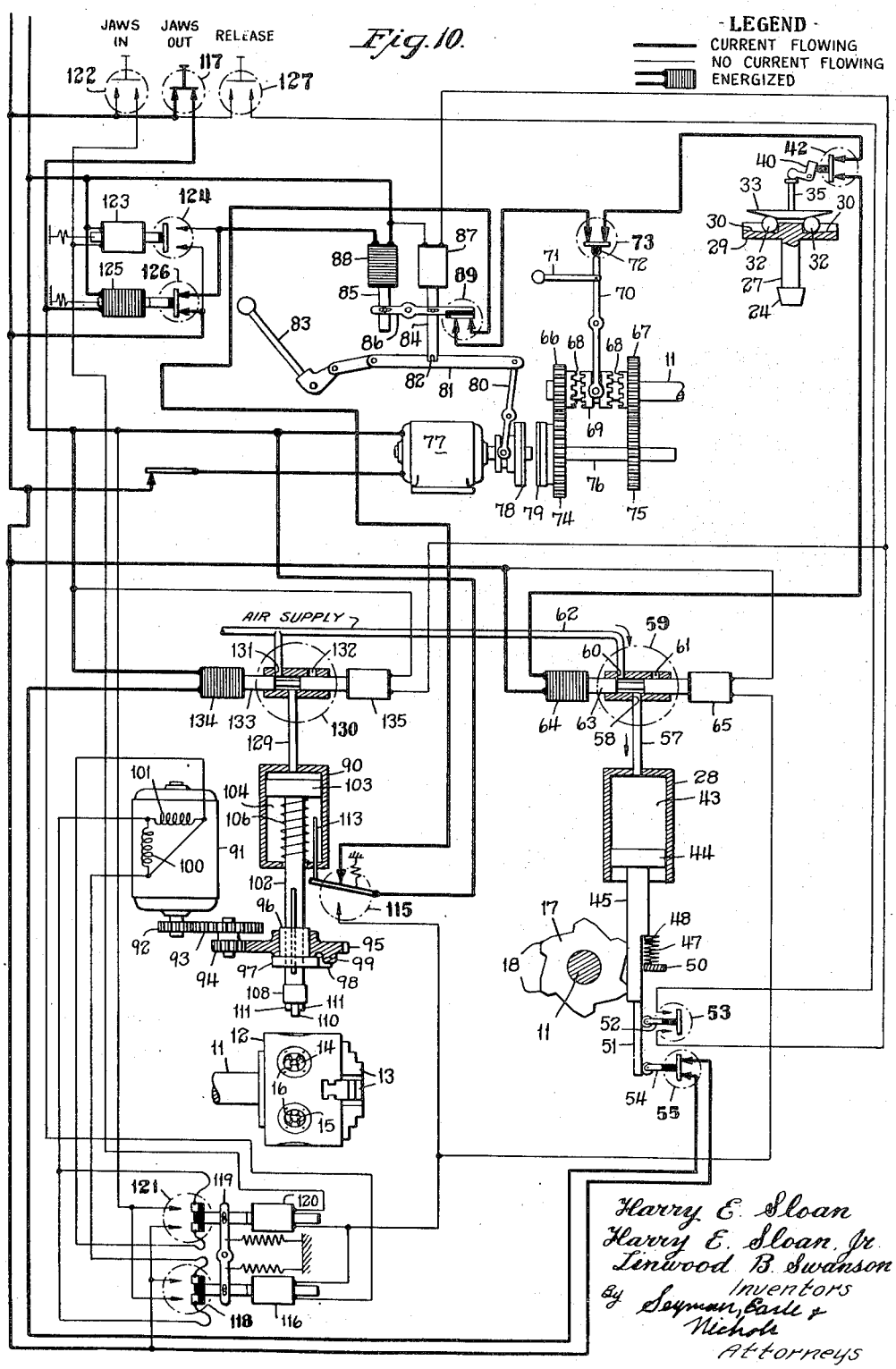

Aug. 14, 1951

H. E. SLOAN ET AL
POWER-DRIVEN CHUCK-OPERATING MEANS FOR
LATHES AND OTHER MACHINES 2,563,970

Filed July 27, 1950

- LEGEND -
CURRENT FLOWING
NO CURRENT FLOWING
ENERGIZED

Harry E. Sloan
Harry E. Sloan, Jr.
Linwood B. Swanson
Inventors
By Seymour, Earle &
Nichols
Attorneys

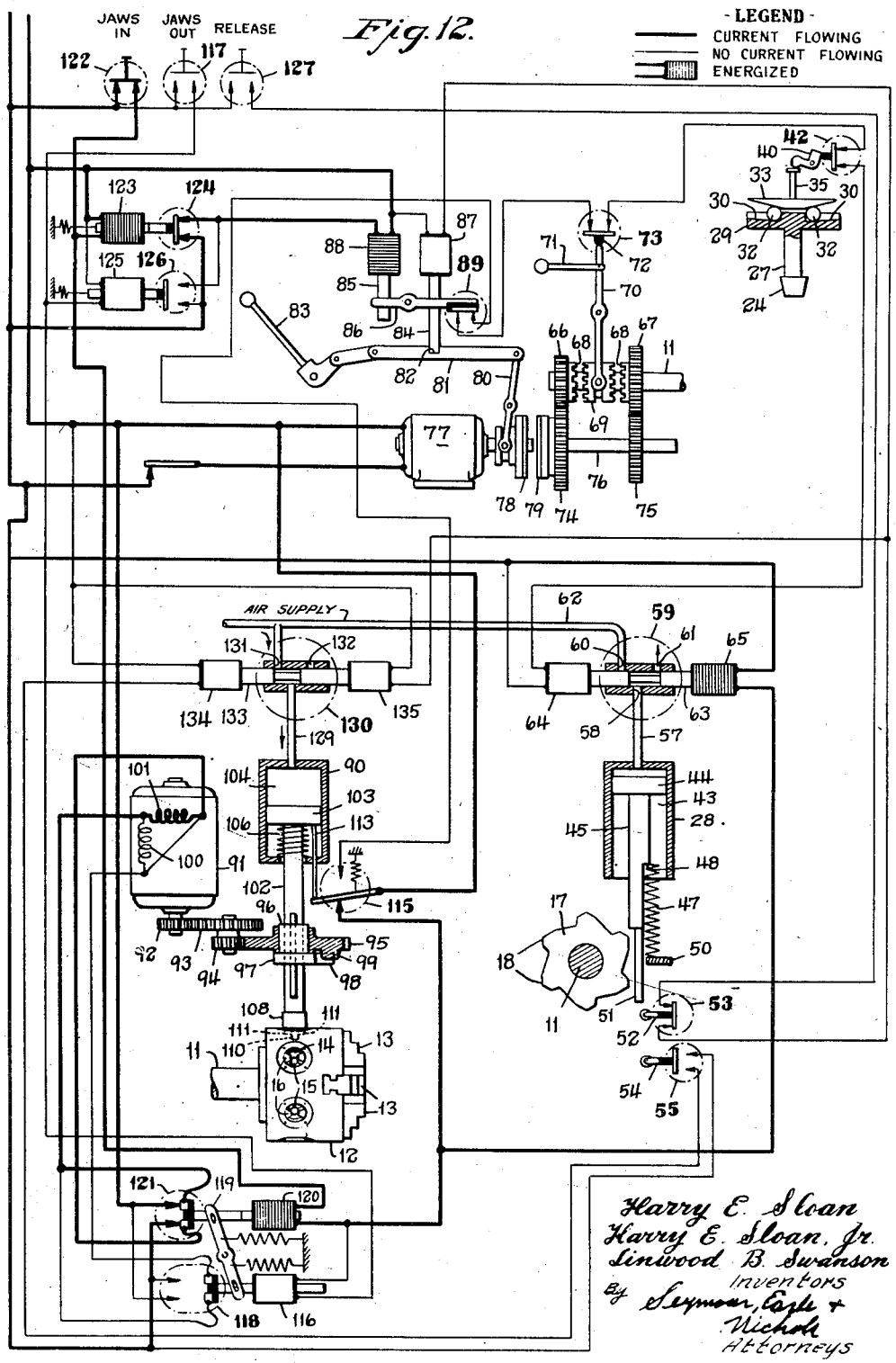

Aug. 14, 1951
H. E. SLOAN ET AL
POWER-DRIVEN CHUCK-OPERATING MEANS FOR
LATHES AND OTHER MACHINES
2,563,970
Filed July 27, 1950
10 Sheets—Sheet 10
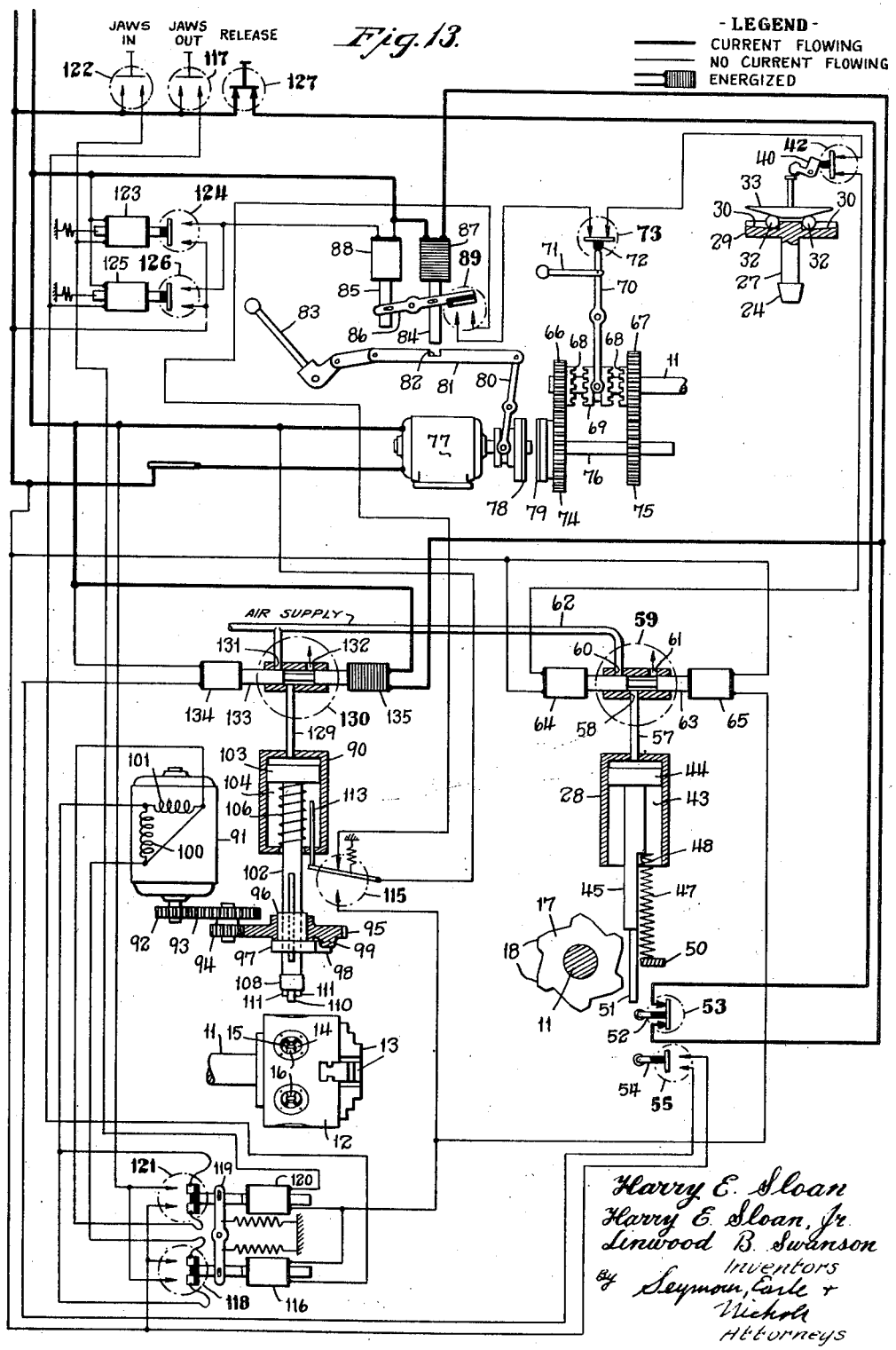

Patented Aug. 14, 1951

2,563,970

UNITED STATES PATENT OFFICE 2,563,970

POWER-DRIVEN CHUCK-OPERATING MEANS FOR LATHES AND OTHER MACHINES

Harry E. Sloan, Hartford, Harry E. Sloan, Jr., West Hartford, and Linwood B. Swanson, New Britain, Conn., assignors to The Cushman Chuck Company, Hartford, Conn., a corporation of Connecticut Application July 27, 1950, Serial No. 176,112

20 Claims. (Cl. 279—1)

The present invention relates to improvements in chuck-operating means and relates more particularly to power-driven chuck-operating means for lathes and other machines employing chucks, i. e., power-driven means whereby the jaws of a chuck may be moved into and out of engagement with a work-piece.

One of the objects of the present invention is to provide superior power-driven chuck-operating means whereby a chuck may be first automatically properly oriented and subsequently automatically engaged by jaw-operating means to effect the movement of its jaws.

Another object of the present invention is to provide superior means of the character referred to and having its components so constructed and arranged as to preclude the engagement with a chuck of the jaw-operating means, until such time as the rotary movement of the chuck has stopped and it has been properly oriented.

A further object is to provide superior power-driven chuck-operating means whereby after a chuck has been engaged by a retirable power-driven jaw-operating member, the power driving of the chuck itself is prevented.

Still another object of the present invention is to provide means of the character referred to and wherein provision is made whereby automatic safeguards are provided for preventing the performance of operation in a wrong or dangerous sequence.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a broken view in side elevation of a portion of a lathe and showing in conjunction therewith power-driven chuck-operating means constructed in accordance with the present invention;

Fig. 2 is a broken view partly in end elevation and partly in vertical section on the line 2—2 of Fig. 1 but on a larger scale and with a portion of the cylinder of the indexing-plunger shown in section;

Fig. 4 is a broken sectional view taken on the line 4—4 of Fig. 2;

Fig. 5a is a view partly in front elevation and partly in vertical section of the portions of the mechanism adjacent the chuck and including the jaw-operating means therefor;

Fig. 5b is a continuation of the lower portion of Fig. 5a but on a smaller scale and including a chuck;

Fig. 6 is a broken transverse sectional view taken on the line 6—6 of Fig. 5a;

Fig. 7 is a similar view taken on the line 7—7 of Fig. 5b but on a larger scale;

Fig. 8 is a broken perspective view looking toward the lower or inner end of the jaw-operating spindle and jaw-operating sleeve but on a larger scale than the showing of Fig. 5b;

Fig. 9 is a combined schematic and diagrammatic view indicating the conditions which exist when the chuck is being rotated to accomplish operations upon a work-piece and prior to the stoppage thereof for the removal of such work-piece and its replacement by a fresh work-piece;

Fig. 10 is a view similar to Fig. 9 but showing the conditions which prevail when the clutch has been moved out, the gear set shifted into neutral, the manually-operable "jaws-out" switch closed, the indexing of the chuck completed and air admitted to the cylinder of the jaw-operating spindle, which spindle, however, has not as yet been moved downwardly by the said air;

Fig. 11 is a view of the same character as Figs. 9 and 10, but indicating a subsequent set of conditions to those shown in Fig. 10 and wherein the jaw-operating spindle has been engaged with the chuck, the jaw-operating motor has been started and has retired the gripping-jaws of the said chuck, and the indexing-plunger has been retired;

Figure 3:
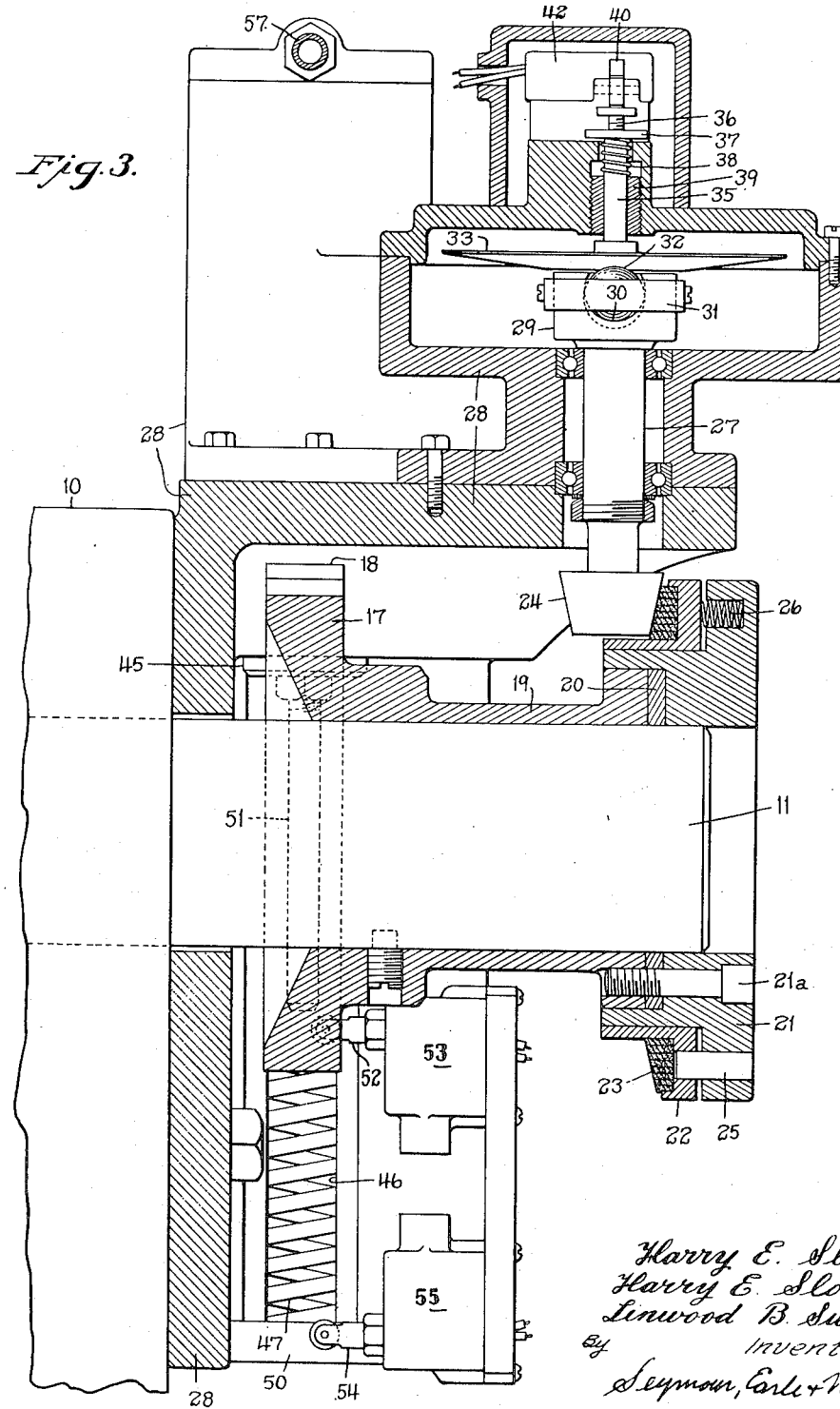
Fig. 3 is a broken vertical central sectional view taken on the line 3—3 of Fig. 2.

Fig. 12 is a view similar to Figs. 9, 10 and 11, but showing the conditions which prevail after the manually-operable "jaws-out" switch has been moved into its open-circuit position, the manually-operable "jaws-in" switch has been moved into its circuit-closing position, and the jaw-operating motor is operating the jaw-operating spindle to effect the inward movement of the gripping-jaws; and Fig. 13 is a view similar in character to Figs. 9 to 12 inclusive, but showing the conditions which prevail after the completion of the inward movement of the gripping-jaws of the chuck, after the manually-operable "jaws-in" switch has moved into its open-circuit position, and after the release-switch has been closed to thereby retire the various elements preparatory to the operator again starting the rotation of the chuck by shifting the gear set into operative condition and throwing in the clutch.

The particular mechanism illustrated in the accompanying drawings for purposes of making clear a preferred embodiment of the present invention, includes a spindle-head 10 which may form a feature of a lathe or other machine employing a chuck. Mounted for rotation in the spindle-head 10 is a chuck-spindle 11 rigidly carrying at one end a chuck generally designated by the reference character 12 and which may be of any well-known form common in the art and having a plurality of gripping-jaws 13 which are movable in radial directions to grip and release a work-piece (not shown) upon which it is desired to operate. The said chuck requires no detailed description herein save to note that it is provided with a plurality of jaw-operating pinions 14 which, in a manner normal in the art, are each mounted for rotation about a radial axis. In the present instance, each of the pinions 14 is formed with a central outwardly-opening pilot-recess 15 flanked by two diametrically-opposite coupling-lugs 16. The pilot-recess 15 and the adjacent coupling-lugs 16 of each jaw-operating pinion 14 are designed and adapted to be engaged by a suitable tool to effect the rotation of a given one of the said pinions in either of two directions, to either advance or retire the gripping-jaws 13 or their equivalent—all in a manner as will hereinafter appear.

At its end opposite the chuck 12, the chuck-spindle 11 has rigidly mounted thereon an indexing-cam generally designated by the reference character 17 which is formed upon its periphery with six (more or less) lobes 18 corresponding in number to the number of jaw-operating pinions 14 in the particular chuck 12 chosen for use. As indicated particularly well in Fig. 3, the indexing-cam 17 is formed with a hub 19 having the said indexing-cam 17 at its inner end and having engaged with its outer face a removable and replaceable shim 20.

Rigidly attached by means of screws 21a (Fig. 3) to the outer end of the hub 19 of the indexing-cam 17 is a driving-head 21, which by virtue of its said connection with the hub 19, is driven by the chuck-spindle 11.

Mounted upon the driving-head 21 above referred to with freedom for axial movement thereon is a friction-gear 22 having a laminated friction-facing 23 engaging with and driving a friction-pinion 24, as is especially well indicated in Fig. 3.

While free for axial movement, the friction-gear 22 above referred to is connected to the driving-head 21 for being driven thereby, by any suitable number of coupling-pins 25. Furthermore, the said friction-gear 22 is yieldingly urged into engagement with the friction-pinion 24 by a suitable number of helical springs 26 which may be recessed into the inner face of the driving-head 21, as is indicated in Fig. 3.

The friction-pinion 24 above referred to is rigidly mounted upon the lower end of a shaft 27 (Figs. 2 and 3), which latter is supported for rotation by any suitable antifriction bearings in a multi-part frame or housing generally designated by the reference character 28. The said frame or housing 28 may be secured in any suitable manner to the adjacent end of the spindle-head 10 or other suitable part of the machine in connection with which the device is employed.

At its upper end, the shaft 27 is formed with a substantially-rectangular head 29 formed with two (more or less) substantially-radial but upwardly-and-outwardly-inclined rollways 30, each of which opens through the outer edge of the head 29. The outer end of each of the rollways 30 is closed by a stop-yoke 31, as is indicated in Figs. 2 and 3.

Located in each of the rollways 30 of the head 29 is a rolling-member which in the present instance is in the form of a ball 32, though cylindrical rollers may be employed if desired. Resting upon the rolling-members 32 is an actuating-plate 33 having a conically-contoured under face sloping radially outwardly and upwardly but at a greater angle than the rollways 30 so as to provide, in effect, an outwardly-flaring passage for each of the rolling-members 32. The shape and inclination of the said outwardly-flaring passages is such that when the rolling-members 32 are moved by gravity into their innermost positions as indicated in Fig. 2, the said actuating-plate 33 will be elevated, and when the said rolling-members 32 are moved by centrifugal force into the outer ends of the rollways 30, the said actuating-plate 33 may move downwardly.

The actuating-plate 33 above referred to is preferably held against rotary movement, though left free for vertical axial movement, and to prevent the said rotary movement, a guide-pin 34 (Fig. 2) projects downwardly from the adjacent portion of the frame or housing 28 into a suitable passage in the said actuating-plate.

The actuating-plate 33 carries an upwardly-projecting actuating-plunger 35 which, in turn, carries an upwardly-projecting adjusting-screw 36. Mounted upon the said adjusting-screw 36 is an adjusting-nut 37 against the underside of which presses the upper end of a helical counterbalance spring 38, as is indicated in Figs. 2 and 3. The lower end of the said counterbalance spring rests upon the upper face of a bushing 39 mounted in the adjacent portion of the frame or housing 28, as is shown in Figs. 2 and 3, and in the bore of which the actuating-plunger 35 reciprocates.

Resting upon the upper face of the adjusting-screw 36 above referred to is the horizontal arm of an L-shaped switch-actuating lever 40 pivoted to an adjacent portion of the frame or housing 28. The said lever 40 also has an upwardly-extending arm which is adapted to inwardly press a plunger 41 forming part of a standard form of snap-action switch 42 of a type which tends to be normally open except when the said plunger 41 is pressed inwardly.

The major portion of the weight of the actuating-plate 33 and the parts connected thereto is counterbalanced by the counterbalance spring 38, though there is sufficient residual weight to enable the said actuating-plate to descend and thus permit the switch 42 to open when centrifugal force throws the rolling-members 32 outwardly as the shaft 27 is revolved. On the other hand, the residual weight of the actuating-plate 33 and the parts carried thereby is sufficiently light so that when the shaft 27 and its head 29 approach zero speed, the rolling-members 32 or their equivalent will have sufficient weight to roll inwardly in the rollways 30 and thereby force the actuating-plate and associated parts upwardly into the positions shown in Figs. 2 and 3 to thereby close the switch 42—all for purposes as will hereinafter appear.

Formed in the frame or housing 28 adjacent the indexing-cam 17, is a downwardly-opening cylinder 43 (Fig. 2) in which tightly fits with capacity for reciprocating movement, a piston-head 44. The said piston-head 44 is rigid with the upper portion of a vertically-reciprocating indexing-plunger 45. The said indexing-plunger may be moved downwardly for engagement with the adjacent one of the lobes 18 of the indexing-cam 17 to turn the said cam and hence similarly turn the chuck-spindle 11 into a properly-oriented or -indexed position for purposes as will hereinafter appear.

Formed partly in one side of the lower portion of the indexing-plunger 45 and partly in the adjacent portion of the frame or housing 28, is a spring-pocket 46 for accommodating a helical return-spring 47 as is especially well shown in Fig. 2. The upper end of the return-spring 47 thrusts against a downwardly-facing shoulder 48 formed in one side of the indexing-plunger 45 and is adapted, when in its uppermost position, to engage with a downwardly-facing stop-shoulder 49 forming a feature of the adjacent portion of the frame or housing 28—all as is indicated in Fig. 2. The return-spring 47 will serve normally to hold the indexing-plunger 45 in its retired position as is indicated in Figs. 2 and 3, and at its lower end rests against a retaining-plate 50 covering the lower end of the spring-pocket 46 before referred to.

Rigidly depending from the lower end of the indexing-plunger 45 is a switch-actuating rod 51 which is adapted promptly after the initiation of the downward movement of the said indexing-plunger 45 to engage with and force inwardly the plunger 52 forming a feature of a switch generally designated by the reference character 53. The said switch 53, for purposes as will hereinafter appear, is normally in its circuit-closing position when its plunger 52 is not pushed inwardly. The said switch-actuating rod 51, when the indexing-plunger 45 reaches substantially the limit of its downward movement, is adapted to engage with and inwardly press the plunger 54 forming part of a switch 55 located below the switch 53 just above referred to. The switch 55 is so constructed and arranged as to be in its circuit-opening position when the switch-actuating rod 51 is not in engagement therewith. Both the switches 53 and 55 are supported by the frame or housing structure 28.

The upper end of the cylinder 43 in which the indexing-plunger 45 reciprocates is formed with a fluid-passage 56 with which is connected a tube 57 through which air or other fluid may move into and out of the upper end of the said cylinder in a manner as will hereinafter appear.

The tube 57 just above referred to connects to a port 58 formed in a fluid-control valve generally designated by the reference character 59 and schematically indicated in Figs. 9 to 13 inclusive. The said fluid-control valve is also formed with an inlet-port 60 and an exhaust-port 61. The inlet-port 60 has connected to it a fluid-supply tube 62 leading from any suitable source of air or other fluid under pressure.

The fluid-control valve 59 also includes a reciprocating valve-plunger 63 which may be shifted in one direction by a solenoid 64 and in the opposite direction by a solenoid 65, all as is indicated in Figs. 9 to 13 inclusive.

From the foregoing, it will be apparent that when the valve-plunger 63 of the fluid-control valve 59 is in the position in which it is indicated in Figs. 9, 11, 12 and 13, the supply of fluid to the cylinder 43 is cut off and the upper end thereof is opened to the atmosphere through the exhaust-port 61, all with the result that the indexing-plunger 45 will be held in its uppermost position by its return-spring 47. It will be equally apparent that when the solenoid 64 is energized, the valve-plunger 63 will be shifted so as to connect the tube 57 with the fluid-supply tube 62 and at the same time cut off the exhaust-port 61 as is indicated in Fig. 10.

The particular lathe shown in the drawings in conjunction with the apparatus of the present invention, has mounted upon its chuck-spindle 11 with freedom for rotation thereon a pair of spaced-apart gear wheels 66 and 67 respectively of different diameters and each provided on its inner face with coupling-teeth 68. The coupling-teeth 68 of the gear wheel 66 or of the gear wheel 67 are adapted to be selectively engaged by the respective opposite toothed ends of a selector-slide 69 slidable on the chuck-spindle 11 and coupled thereto for rotation in a manner usual in the art.

The selector-slide 69 may be shifted as desired by a lever 70 having pivoted thereto a reciprocating manually-operable handle 71, as is indicated in Figs. 9 to 13 inclusive. The upper end of the lever 70 (as viewed in Figs. 9 to 13 inclusive) is adapted to engage and raise the plunger 72 of a switch generally designated by the reference character 73. The said switch 73 is so constructed and arranged as to be in its open-circuit position when the selector-slide 69 is in any other than its neutral position.

The gear wheels 66 and 67 are respectively meshed into and driven by gear wheels 74 and 75 rigidly mounted upon and driven by a drive-shaft 76 extending in parallelism with and adjacent to the chuck-spindle 11, as is schematically indicated in Figs. 9 to 13 inclusive.

The drive-shaft 76 is driven for the purpose of rotating the spindle 11 and chuck 12 by a suitable electric motor 77 (Figs. 9 to 13 inclusive), and interposed between the said electric motor and the said drive-shaft 76 is a clutch comprising two mutually-engageable frictional elements 78 and 79. The clutch-element 78 is slidable into and out of driving engagement with its complemental element 79 (fixed to the gear wheel 74) by means of a lever 80 having pivotally connected to its upper end (as viewed in Figs. 9 to 13 inclusive) a control-slide 81 having a locking-notch 82 in its upper surface. In the present instance, the shifting of the control-slide 81 is effected by means of a manually-operable hand lever 83 to thus similarly shift the clutch-element 78.

Located adjacent the control-slide 81 which serves to actuate the clutch-element 78 is a reciprocating locking-plunger 84 adapted to move downwardly into engagement with either the edge of the control-slide 81 or with the locking-notch 82 therein, depending upon the position in which the said control-slide 81 is at the time. The said locking-plunger 84 is connected for concurrent movement to an adjacent reciprocating plunger 85 by means of a lever 86. The locking-plunger 84 is adapted to be pulled upwardly by an unlocking-solenoid 87 and is adapted to be moved downwardly through the intermediary of the lever 86 and plunger 85 by a locking-solenoid 88.

The lever 86 above referred to controls a switch generally designated by the reference character 89, which can be moved into its circuit-closing position only when the clutch-element 78 is shifted out of engagement with its complemental clutch-element 79, to thus bring the locking-notch 82 of the control-slide 81 into registration with the lower end of the locking-plunger 84.

Having described above preferred means whereby the chuck 12 is indexed after the cessation of the power-driving thereof, a preferred means of operating the gripping-jaws 13 of the said chuck will now be described.

Mounted upon the spindle-head 10 adjacent the chuck 12 is a multi-part combined supporting-bracket and housing generally designated by the reference character 90 and indicated in Figs. 1 and 5a. Carried by the bracket and housing 90 just referred to is a reversible jaw-operating electric motor 91 which carries and drives a pinion 92. The said pinion 92 meshes into and drives a gear wheel 93 (Fig. 5a) which, in turn, carries and drives a pinion 94 coaxial therewith. The pinion 94, in turn, meshes into and drives a gear wheel 95 which is located eccentrically with respect to the axis of the motor 91 and is mounted with freedom for limited rotation upon the hub 96 of a lost-motion drive-member 97 indicated in Figs. 5a and 6.

The drive-member 97 above referred to is provided with a radially-projecting drive-lug 98 adapted to have its respective opposite faces engaged by a drive-lug 99 depending from the gear wheel 95 previously described.

The electric motor 91 is of the reversible type and for convenience of illustration, it is shown in Figs. 9 to 13 inclusive as having two windings respectively designated by the reference characters 100 and 101 and respectively constituting what may be referred to as "jaws-out" winding and "jaws-in" winding. The said windings are selectively energizable in a manner as will hereinafter appear to respectively cause the motor 91 to move the jaws 13 of the chuck 12 outwardly and inwardly, all in a manner as will hereinafter appear.

The drive-member 97 and its hub 96 are journaled for rotation in the adjacent portion of the combined supporting-bracket and housing 90 and have extending axially through them a jaw-operating spindle 102. The said spindle is splined within and to the elements 96 and 97 so as to be rotated thereby but to be free for relative axial movement with respect thereto. The said splining is particularly well indicated in Fig. 6.

The upper end of the jaw-operating spindle 102 has mounted thereon a piston-head generally designated by the reference character 103 and adapted to vertically reciprocate in a cylinder 104 formed within the multi-part supporting-bracket and housing 90 in a location alongside of the motor 91 as is indicated in Fig. 5a. The upper end of the spindle 102 is connected to the piston-head 103 by means of an antifriction-bearing 105 which serves to couple the two said parts 102 and 103 together against relative axial movement but which permits the jaw-operating spindle 102 to turn with respect to the said piston-head 103.

The jaw-operating spindle 102 is yieldingly urged away from the chuck 12 by means of a helical return-spring 106 encircling the upper portion of the said spindle and seated at its upper end against the underface of the piston-head 103 and at its lower end against a spring-seat 107 within the lower portion of the cylinder 104, as is indicated in Fig. 5a.

Coupled to the lower end of the jaw-operating spindle 102 for concurrent rotation therewith but with freedom for limited axial movement with respect thereto, is a jaw-operating sleeve 108 which is splined to the said spindle 102, as is indicated in Figs. 5b and 7. A helical buffer-spring 109 encircles the reduced lower portion of the jaw-operating spindle 102 within the sleeve 108 and serves to hold the said sleeve yieldingly downwardly with respect to the said spindle, for purposes as will hereinafter appear.

The extreme lower portion of the jaw-operating spindle 102 is reduced in diameter to provide a pilot 110 which is adapted to enter the pilot-recess 15 in a given one of the pinions 14 of the chuck 12. For the purpose of coupling the jaw-operating sleeve 108 and hence also the jaw-operating spindle 102 to a given one of the pinions 14 to effect the rotation of the latter, the jaw-operating sleeve 108 is provided at its lower end with two diametrically-opposite coupling-lugs 111—111 (Fig. 8) which are adapted to fit between the coupling-lugs 16—16 of the adjacent one of the jaw-operating pinions 14.

Secured within the lower portion of the cylinder 104 within which the spindle 102 reciprocates, is a stop-sleeve 112 which limits the downward movement of the piston-head 103. Mounted for reciprocation vertically in the stop-sleeve 112 is a switch-operating plunger 113 resting at its lower end upon the adjacent end of a lever 114 (Fig. 5a). The said lever 114 is operatively connected at its outer end to a double-throw switch generally designated by the reference character 115.

The double-throw switch 115 is so constructed and arranged as to be in closed-circuit series (Figs. 9, 10 and 13) with the switches 89, 73 and 42 when the piston-head 103 is in its upward or retired position, and hence also when the switch-operating plunger 113 is in its upward position. Thus, the switch 115, when in the position just referred to, serves in conjunction with the switches 89, 73 and 42 to control the energization of the solenoid 64.

On the other hand, when the double-throw switch 115 is thrown into the position in which it is indicated in Figs. 11 and 12, the said switch controls the energization of a "jaws-out" solenoid 116 jointly with a manually-operable "jaws-out" switch 117 indicated in Figs. 9 to 13 inclusive of the drawings. The term "jaws-out" as used herein is intended to connote a feature having to do with effecting the outward movement of the jaws 13 of the chuck 12, all in the manner as will more fully hereinafter appear.

When the out solenoid 116 is energized, it will close a double-pole jaws-out switch 118 and thereby energize the jaws-out coil 110 of the jaw-operating motor 91 to cause the same to turn the jaw-operating spindle 102 and the parts carried thereby in the direction required to retire the gripping-jaws 13 radially outwardly to thus release a work-piece.

The core of the jaws-out solenoid 116 above referred to is connected by means of a spring-balanced lever 119 (Figs. 9 to 13 inclusive) to the reciprocating core of an adjacent jaws-in solenoid 120. The said solenoid 120, when energized, serves to close a double-pole jaws-in switch 121 to this energize the jaws-in coil 101 of the motor 91 and thereby turn the same in a direction required to move the jaws 13 of the chuck 12 inwardly toward each other to grip a work-piece. Interposed in the circuit of the jaws-in solenoid 120 is a manually-operable push-button type jaws-in switch 122 preferably located conveniently adjacent the jaws-out switch 117 previously referred to and indicated in Figs. 9 to 13 inclusive.

Also arranged to be energized under the control of the manually-operable jaws-in switch 122 is a solenoid 123 which, when energized, serves to move a switch 124 into its circuit-closing position to thereby also energize the locking-solenoid 88 previously referred to. Located adjacent the solenoid 123 is a similar solenoid 125 which is energizable under the control of the manually-operable jaws-out switch 117 and which, when energized, serves to close a switch 126 to also effect the energization of the locking-solenoid 88.

Located adjacent the jaws-out switch 117 is a similar manually-operable switch 127 which, for convenience of description, may be termed a "release" switch inasmuch as when it is manually moved into its circuit-closing position, it will effect the retirement of the jaw-operating spindle 102 as well as other releasing operations, all in the manner as will more fully hereinafter appear.

Communicating with the outer end of the cylinder 104 in which the jaw-operating spindle 102 reciprocates, is a passage 128 through which air or other fluid may be admitted to and exhausted from the upper portion of said cylinder 104. Communicating with the passage 128 is a tube 129 leading to a central port in a fluid-control valve generally designated by the reference character 130 and schematically indicated in Figs. 9 to 13 inclusive. The said fluid-control valve is also formed with an inlet-port 131 and an exhaust-port 132. The inlet-port 131 is connected to the previously-described fluid-supply tube 62, while the exhaust-port 132 opens to the atmosphere.

The fluid-control valve 130 also includes a reciprocating valve-plunger 133 which is shifted in one direction by a solenoid 134 and in the opposite direction by a solenoid 135.

By reference to Figs. 9 to 13 inclusive, it will be apparent that the solenoid 134 above referred to is under the control of the normally open switch 55, while the companion solenoid 135, in common with the unlocking-solenoid 87, is under the control of the plunger-operated switch 53 and the manually-operable release-switch 127.

Operation

For purposes of description, it may be assumed that the chuck-driving electric motor 77 is energized and that the clutch-element 78 is engaged with the clutch-element 79 and further, that the selector-slide 69 of the gear set is clutched with one or the other of the gears 66 or 67 to thereby effect the rotation of the chuck-spindle 11 and the chuck 12 carried thereby. It is to be further assumed that the chuck-jaws 13 are in an inward position for the purpose of gripping a work-piece which is being operated upon, all as indicated in Fig. 9.

Now, upon the conclusion of the operation upon the work-piece, the operator will naturally desire to remove the said work-piece from the chuck 12 and replace it with a fresh work-piece. This, however, the operator cannot do until after he has manually shifted the selector-slide 69 of the gear set into a neutral position, to thereby close the switch 73, and has also disengaged the clutch-element 78 from its complemental clutch-element 79 by an appropriate manual manipulation of the hand-lever 83 to bring the said parts into the positions indicated in Fig. 10 and hence stop the rotation of the chuck 12. As the rotation of the chuck approaches zero speed, gravity will be permitted to act to cause the rolling-members 32 to move inwardly and thus lift the actuating-plate 33 and the parts carried thereby. This lifting will close the switch 42.

The shifting of the clutch-element 78 out of engagement with its complemental clutch-element 79 will bring the locking-notch 82 in the control-slide 81 into registration with the lower end of the locking-plunger 84.

After the selector-slide 69 has been moved into a neutral position and the clutch-element 78 has been disengaged from the clutch-element 79 so as to bring the said parts into the positions in which they are shown in Fig. 10, the operator may now manually close the jaws-out switch 117.

It may here be noted that the closing of the manually-operable jaws-out switch 117 will be ineffective if done before the chuck has substantially stopped its rotation and/or before the selector-slide 69 has been moved into neutral. It may also be here noted that should the operator of the machine close the jaws-out switch 117 prior to bringing the notch 82 in registration with the locking-plunger 84 and while the switches 42 and 73 are closed, the said locking-plunger will merely descend slightly and be checked by the upper edge of the control-slide 81 and thus preclude the closing of the switch 89.

When the jaws-out switch 117 is moved into its circuit-closing position under the conditions indicated in Fig. 10, it will, under the circumstances, energize the solenoid 125 to cause the latter to close the switch 126. The closing of the switch 126 will energize the locking-solenoid 88, with the result that the latter will act through the intermediary of the lever 86 to move the locking-plunger 84 downwardly into the locking-notch 82 of the control-slide 81 and will concurrently close the switch 89. In this manner, the clutch-element 78 will be locked out of engagement with its complemental clutch-element 79 so that it is, under the circumstances, impossible to have the chuck 12 rotating under power drive. The closing of the switch 89 will effect the energization of the solenoid 64 inasmuch as at this time the switches 42 and 73 will have been previously placed in their closed-circuit positions, as above described.

The energization of the electromagnet 64 will shift the valve-plunger 63 into the position indicated in Fig. 10, thereby permitting air to enter the upper end of the cylinder 43 to force the indexing-plunger and parts connected thereto downwardly into the position indicated in Fig. 10. The described downward movement of the indexing-plunger 45 will cause the latter to engage with the indexing-cam 17 and thus turn the chuck 12 so as to bring one of its jaw-operating pinions 14 in axial registration with the jaw-operating spindle 102. The described descent of the indexing-plunger 45 will also cause its switch-actuating rod 51 to sequentially open the switch 53 and close the switch 55.

The described opening of the switch 53 will render the release-switch 127 ineffective should it be inadvertently operated and will thereby also make it impossible to energize either of the solenoids 87 or 135 under the present conditions.

The opening of the switch 53 will prevent the chuck 12 from being power driven at this time, and should the indexing-plunger 45 jam or otherwise stall before completing its indexing-stroke and retirement, the said switch 53 will remain open.

The described closing of the switch 55 as the said indexing-plunger reaches approximately the limit of its downward movement and after it has turned the indexing-cam 17, will energize the solenoid 134. The described energization of the solenoid 134 will cause the latter to move the valve-plunger 133 into the position indicated in Fig. 10, thereby supplying air to the upper end of the cylinder 104 to eventually force the jaw-operating spindle 102 downwardly. It is to be noted that in Fig. 10 that while air has just been admitted to the upper end of the cylinder 104, the parts are shown in the position just prior to the said air becoming effective to depress the jaw-operating spindle 102.

Assuming now that the parts have reached the positions in which they are indicated in Fig. 10 with the fluid pressure about to depress the jaw-operating spindle 102, reference may now be had to succeeding Fig. 11 wherein the jaw-operating spindle 102 is shown as having been depressed to seat its pilot 110 in the pilot-recess 15 in the aligned one of the jaw-operating pinions 14 of the chuck 12. This movement will also serve to cause the coupling-lugs 111—111 carried by the said spindle 102 to either engage with the outer faces of the coupling-lugs 16—16 of the said pinion, or to fit between the latter, depending upon conditions of orientation at this time. If the coupling-lugs 111—111 do not fit between the coupling-lugs 16—16 of the registering-pinion, the jaw-operating sleeve 108 (Figs. 5a, 5b and 8) will halt and cause the buffer-spring 109 to compress. As soon, however, as the jaw-operating spindle 102 is caused to rotate as hereinafter described, the said coupling-lugs 111—111 will move into coupling relationship between the coupling-lugs 16—16 under the urge of the said buffer-spring 109.

Shortly before the jaw-operating spindle 102 has reached the limit of its downward movement as just above described, the cylinder-head 103 will shift the double-throw switch 115 from the position in which it is shown in Figs. 9, 10 and 13 into the position shown in Figs. 11 and 12. The described movement of the switch 115 will break the circuit to the solenoid 64 and will close the circuit through the opposite complemental solenoid 65 and also through the jaws-out solenoid 116.

The described energization of the solenoid 65 will shift the valve-plunger 63 into the position indicated in Fig. 11 (the complemental solenoid 64 having been previously deenergized as described), to thereby cut off the supply of fluid to the upper end of the cylinder 43 and open the latter to the atmosphere. The indexing-plunger 46 and the parts carried thereby will now rise under the urge of the return-spring 47, thus permitting the switch 55 to again open and the switch 53 to again close.

The described energization of the jaws-out solenoid 116 (Fig. 11) will cause the same to close the jaws-out switch 118, thus energizing the jaws-out winding 100 of the reversible jaw-operating motor 91. While the coupling-lugs 111—111 carried by the now-depressed jaw-operating spindle 102 are still engaged with the coupling-lugs 16—16 of the adjacent pinion 14 of the chuck 12, the jaw-operating motor 91 will now be caused to turn the jaw-operating spindle 102 and hence also the particular jaw-operating pinion 14 engaged by it in the direction required to retract the gripping-jaws 13 and thus release a work-piece which may have been previously gripped. It is to be noted that at this time (Fig. 11), the locking-solenoid 88 remains energized to thus insure that the locking-plunger 84 will remain in locking engagement with the control-slide 81 of the clutch, thus precluding the application of rotating power to the chuck 12 from the chuck-driving motor 77.

After the parts have assumed the positions in which they are indicated in Fig. 11, the gripping-jaws 13 will have been retired sufficiently to release the work-piece previously gripped thereby. The operator should now release the manually-operable jaws-out switch 117, thereby stopping the rotation of the jaw-operating motor 91 in the direction just above described, but still leaving the jaw-operating spindle 102 in its lowermost position inasmuch as the valve-plunger 133 will still remain in the position to supply fluid under pressure to the upper end of the cylinder 104.

After having removed the finished work-piece from the chuck 12 and having replaced the same with a fresh work-piece, the apparatus is in readiness to have the gripping-jaws 13 moved inwardly to grip such said fresh work-piece.

To effect the gripping of the fresh work-piece as above referred to, the operator will now manually close the jaws-in switch 122, as is indicated in Fig. 12, thereby energizing the jaws-in solenoid 120 and simultaneously energizing the solenoid 123. The energization of the solenoid 123 will close the switch 124 (the solenoid 125 having been deenergized) and thereby maintain the locking-solenoid 88 energized, and thus insure that the clutch cannot be re-engaged at this time.

The described energization of the jaws-in solenoid 120 (the companion jaws-out solenoid 116 having been previously deenergized by the release of the jaws-in switch 117) will close the jaws-in switch 121 as is indicated in Fig. 12, to energize the jaws-in winding 101 of the jaw-operating motor 91. The energization of the jaws-in winding 101 will now cause the jaw-operating motor 91 to turn the jaw-operating spindle 102 in the direction required to move the gripping-jaws 13 inwardly into engagement with fresh work-piece before referred to. When the fresh work-piece has been firmly gripped, the operator will release the manually-operable jaws-in switch 122, thereby permitting the same to open and thus stopping the rotation of the jaw-operating motor 91 and hence also the jaw-operating spindle 102. Under the circumstances last described, the jaw-operating spindle 102 will still remain in engagement with the chuck as is shown in Fig. 12.

The apparatus and the sequence of operations are such that the next normal operation would be to start the rotation of the chuck 12 for the desired operations upon the fresh work-piece. As a preliminary, however, the operator is obligated by reason of the construction and arrangement of the elements, to now manually close the release-switch 127 as is indicated in Fig. 13.

The manual closing of the release-switch 127 will energize the various circuits in the manner indicated in Fig. 13, from which it will be noted that the unlocking-solenoid 87 has now become energized (its companion locking-solenoid 88 having been previously deenergized by the opening of the jaws-in switch 122), thereby effecting the retirement of the locking-plunger 84 and thus freeing the element 78 for re-engagement with the companion element 79 of the clutch.

The closing of the release-switch 127 will also energize the solenoid 135 to again shift the valve-plunger 133 back into the position wherein it cuts off the supply of fluid under pressure to the upper end of the cylinder 104 and opens the latter to the atmosphere, as is indicated in Fig. 13. The opening to the atmosphere of the upper end of the cylinder 104 will permit the return-spring 106 to assert itself to elevate or retire the jaw-operating spindle 102 and disengage it from the chuck 12 so that the said spindle resumes the position in which it is shown in Fig. 13. The described rise or retirement of the jaw-operating spindle 102 will cause the double-throw switch 115 to break the circuit through the jaws-in solenoid 120 (the said circuit having also been previously broken by the opening of the jaws-in switch 122) and will cause the said switch 115 to shift back into the position in which it is shown in Figs. 9 and 13.

After the jaw-operating spindle 102 has been fully retired as above described, the operator may permit the release-switch 127 to move into its open-circuit position whereupon the parts are in readiness for again starting the rotation of the chuck 12 to perform the desired operations upon a fresh work-piece gripped by the gripping-jaws 13.

The operator may now shift the selector-slide 69 into engagement with the desired one of the gears 66 or 67, thereby opening the switch 73. The operator may now manipulate the hand lever 83 to re-engage the element 78 with the element 79 of the clutch thereby again starting the rotation of the chuck 12.

The parts will now have reassumed the positions in which they are shown in Fig. 9 preparatory to another cycle of operation.

From the foregoing, it will be apparent that the clutch must be out to close the switch 89, the selector-slide must be in neutral to close the switch 73, and the rotation of the chuck 12 must be substantially stopped to close the switch 42—all before the closing of the jaws-out switch 117 or the jaws-in switch 122 can be effective.

It will also be apparent that the jaw-operating motor 91 cannot be energized to rotate the jaw-operating spindle 102, until after the chuck has first been indexed and then engaged by the jaw-operating sleeve 108. This is due to the fact that the double-throw switch 115 must be moved into the position shown in Figs. 11 and 12 by the descent of the spindle 102 before energy may be supplied to the jaw-operating motor 91.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. Power-driven chuck-operating means, including in combination: a jaw-operating motor; a jaw-operating spindle mounted both for rotary movement and for reciprocating movement toward and away from a chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with a chuck; and chuck-indexing means including an indexing-cam and an indexing-member advanceable and retirable to and from engagement with said indexing cam to turn a chuck into position for operative engagement by the said jaw-operating spindle.

2. Power-driven chuck-operating means, including in combination: a jaw-operating motor; a jaw-operating spindle mounted both for rotary movement and for reciprocating movement toward and away from a chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with a chuck; chuck-indexing means including an advanceable and retirable indexing-member and constructed and arranged to turn a chuck into position for operative engagement by the said jaw-operating spindle; and automatic coordinating-means constructed and arranged to be controlled by the speed of rotation of a chuck and constructed and arranged to prevent the advance of the indexing-member of the said chuck-indexing means until after the said chuck has slowed down from its normal running speed.

3. Power-driven chuck-operating means, including in combination: a jaw-operating motor; a jaw-operating spindle mounted both for rotary movement and for reciprocating movement toward and away from a chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with a chuck; chuck-indexing means including an advanceable and retirable indexing-member and constructed and arranged to turn a chuck into position for operative engagement by the said jaw-operating spindle; electrically-controlled means controlling the advance of the said indexing-member; and automatic coordinating-means constructed and arranged to be controlled by the speed of rotation of a chuck and including an electric switch in turn controlling the said electrically-controlled means, the said coordinating-means being also constructed and arranged to prevent the advance of the indexing-member of the said chuck-indexing means until after said chuck has slowed down from its normal running speed.

4. Power-driven chuck-operating means, including in combination: a jaw-operating motor; a jaw-operating spindle mounted both for rotary movement and for reciprocating movement toward and away from a chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with a chuck; chuck-indexing means including an indexing-cam and an indexing-member advanceable and retirable to and from engagement with said indexing-cam to turn a chuck into position for operative engagement by the said jaw-operating spindle; and automatic coordinating-means controlled by the said chuck-indexing means and constructed and arranged to prevent the engagement of the said jaw-operating spindle with a chuck until after the said indexing-member has advanced to index the same.

5. Power-driven chuck-operating means, including in combination: a jaw-operating motor; a jaw-operating spindle mounted both for rotary movement and for reciprocating movement toward and away from a chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with a chuck; chuck-indexing means including an advanceable and retirable indexing-member and constructed and arranged to turn a chuck into position for operative engagement by the said jaw-operating spindle; and automatic coordinating-means controlled by the said chuck-indexing means and constructed and arranged to prevent the actuation of the said spindle-advancing-and-retiring means to advance the said jaw-operating spindle until after the said indexing-member has advanced to index a chuck.

6. Power-driven chuck-operating means, including in combination: a jaw-operating motor; a jaw-operating spindle mounted both for rotary movement and for reciprocating movement toward and away from a chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with a chuck; electrically-controlled means controlling the spindle-advancing movement of the said spindle-advancing-and-retiring means; chuck-indexing means including an advanceable and retirable indexing-member and constructed and arranged to turn a chuck into position for operative engagement by the said jaw-operating spindle; and automatic coordinating-means controlled by the said chuck-indexing means and including an electric switch in turn controlling the said electrically-controlled means, the said coordinating-means being constructed and arranged to prevent the actuation of the said spindle-advancing-and-retiring means to advance the said jaw-operating spindle until after the said indexing-member has advanced to index a chuck.

7. Power-driven chuck-operating means, including in combination: a jaw-operating motor; a jaw-operating spindle mounted both for rotary movement and for reciprocating movement toward and away from a chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with a chuck; chuck-indexing means including an indexing-cam and an indexing-member advanceable and retirable to and from engagement with said indexing-cam to turn a chuck into position for operative engagement by the said jaw-operating spindle; first automatic coordinating-means constructed and arranged to be controlled by the rotation of a chuck and constructed and arranged to prevent the advance of the indexing-member of the said chuck-indexing means until after the said chuck has slowed down from its normal running speed; and second automatic coordinating-means controlled by the said chuck-indexing means and constructed and arranged to prevent the actuation of the said spindle-advancing-and-retiring means to advance the said jaw-operating spindle until after the said indexing-member has advanced to index a chuck.

8. Power-driven chuck-operating means, including in combination: a jaw-operating motor; a jaw-operating spindle mounted both for rotary movement and for reciprocating movement toward and away from a chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with a chuck; first electrically-controlled means controlling the spindle-advancing movement of the said spindle-advancing-and-retiring means; chuck-indexing means including an advanceable and retirable indexing-member and constructed and arranged to turn a chuck into position for operative engagement by the said jaw-operating spindle; second electrically-controlled means controlling the advance of the said indexing-member; first automatic coordinating-means constructed and arranged to be controlled by the speed of rotation of a chuck and including an electric switch in turn controlling the said first electrically-controlled means, the said first coordinating-means being constructed and arranged to prevent the advance of the indexing-member of the said chuck-indexing means until after the said chuck has slowed down from its normal running speed; and second automatic coordinating-means controlled by the said chuck-indexing means and including an electric switch in turn controlling the said second electrically-controlled means, the said second coordinating-means being constructed and arranged to prevent the actuation of the said spindle-advancing-and-retiring means to advance the said jaw-operating spindle until after the said indexing-member has advanced to index a chuck.

9. Power-driven chuck-operating means, including in combinaton: a jaw-operating motor; electric switch-means controlling the said motor; a jaw-operating spindle mounted both for rotary movement and for reciprocating movement toward and away from a chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with a chuck; chuck-indexing means including an indexing-cam and an indexing-member advanceable and retirable to and from engagement with said indexing-cam to turn a chuck into position for operative engagement by the said jaw-operating spindle; and electric switch-means controlling the said jaw-operating motor and constructed and arranged to be actuated to start said motor by the spindle-advancing action of the said spindle-advancing-and-retiring means.

10. Power-driven chuck-operating means, including in combination: a jaw-operating motor; a jaw-operating spindle mounted both for rotary movement and for reciprocating movement toward and away from a chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with a chuck; chuck-indexing means including an advanceable and retirable indexing-member and constructed and arranged to turn a chuck into position for operative engagement by the said jaw-operating spindle; automatic coordinating-means constructed and arranged to be controlled by the rotation of a chuck and constructed and arranged to prevent the advance of the indexing-member of the said chuck-indexing means until after the said chuck has slowed down from its normal running speed; and electric switch-means controlling the said jaw-operating motor and constructed and arranged to be actuated to start the said motor by the spindle-advancing action of the said spindle-advancing-and-retiring means.

11. Power-driven chuck-operating means, including in combination: a jaw-operating motor; a jaw-operating spindle mounted both for rotary movement and for reciprocating movement toward and away from a chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with a chuck; chuck-indexing means including an advanceable and retirable indexing-member and constructed and arranged to turn a chuck into position for operative engagement by the said jaw-operating spindle; electrically-controlled means controlling the advance of the said indexing - member; automatic coordinating-means controlled by the rotation of a chuck and including an electric switch in turn controlling the said electrically-controlled means, the said coordinating-means being constructed and arranged to prevent the advance of the indexing-member of the said chuck-indexing means until after the said chuck has slowed down from its normal running speed; and electric switch-means controlling the said jaw-operating motor and constructed and arranged to be actuated to start the said motor by the spindle-advancing action of the said spindle - advancing - and - retiring means.

12. Power-driven chuck-operating means, including in combination: a jaw-operating motor; a jaw-operating spindle mounted both for rotary movement and for reciprocating movement toward and away from a chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with a chuck; chuck-indexing means including an advanceable and retirable indexing-member and constructed and arranged to turn a chuck into position for operative engagement by the said jaw-operating spindle; automatic coordinating-means controlled by the said chuck-indexing means and constructed and arranged to prevent the engagement of the said jaw-operating spindle with a chuck until after the said indexing-member has advanced to index the chuck; and electric switch-means controlling the said jaw-operating motor and constructed and arranged to be actuated to start the said motor by the spindle-advancing action of the said spindle-advancing-and-retiring means.

13. Power-driven chuck-operating means, including in combination: a jaw-operating motor; a jaw-operating spindle mounted both for rotary movement and for reciprocating movement toward and away from a chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with a chuck; chuck-indexing means including an advanceable and retirable indexing-member and constructed and arranged to turn a chuck into position for operative engagement by the said jaw-operating spindle; automatic coordinating-means controlled by the said chuck-indexing means and constructed and arranged to prevent the actuation of the said spindle-advancing-and-retiring means to advance the said jaw-operating spindle until after the said indexing-member has advanced to index a chuck; and electric switch-means controlling the said jaw-operating motor and constructed and arranged to be actuated to start the said motor by the said spindle-advancing action of the said spindle-advancing-and-retiring means.

14. Power-driven chuck-operating means, including in combination: a jaw-operating motor; a jaw-operating spindle mounted both for rotary movement and for reciprocating movement toward and away from a chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with a chuck; electrically-controlled means controlling the spindle-advancing movement of the said spindle-advancing-and-retiring means; chuck-indexing means including an advanceable and retirable indexing-member and constructed and arranged to turn a chuck into position for operative engagement by the said jaw-operating spindle; automatic coordinating-means controlled by the said chuck-indexing means and including an electric switch in turn controlling the said electrically-controlled means, the said coordinating-means being constructed and arranged to prevent the actuation of the said spindle-advancing-and-retiring means to advance the said jaw-operating spindle until after the said indexing-member has advanced to index a chuck; and electric switch-means controlling the said jaw-operating motor and constructed and arranged to be actuated to start the said motor by the spindle-advancing action of the said spindle-advancing-and-retiring means.

15. The combination with a machine having a rotatable chuck, drive-means for rotating the said chuck and releasable coupling-means interposed between the said drive-means and the said chuck for coupling and uncoupling the driving connection between the latter and the said drive-means; of power-driven chuck-operating means, including in combination: a jaw-operating motor; a jaw-operating spindle mounted both for rotary movement and reciprocating movement toward and away from the said chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with the said chuck; chuck-indexing means including an advanceable and retirable indexing-member and constructed and arranged to turn the said chuck into position for operative engagement by the said jaw-operating spindle; and automatic coordinating-means controlled by the said releasable coupling-means and constructed and arranged to prevent the advance of the said indexing-member until after the said coupling-means has been moved into its releasing position.

16. The combination with a machine having a rotatable chuck, drive-means for rotating the said chuck and releasable coupling-means interposed between the said drive-means and the said chuck for coupling and uncoupling the driving connection between the latter and the said drive-means; of power-driven chuck-operating means, including in combination: a jaw-operating motor; a jaw-operating spindle mounted both for rotary movement and reciprocating movement toward and away from the said chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with the said chuck; chuck-indexing means including an advanceable and retirable indexing-member and constructed and arranged to turn the said chuck into position for operative engagement by the said jaw-operating spindle; electrically-controlled means controlling the advance of the said indexing-member; and automatic co-ordinating-means controlled by the said releasable coupling-means and including an electric switch in turn controlling the said electrically-controlled means and associated with the said coupling-means, the said electric switch being constructed and arranged to prevent the advance of the said indexing-member until after the said coupling-means has been moved into its releasing position.

17. The combination with a machine having a rotatable chuck, drive-means for rotating the said chuck and a releasable clutch interposed between the said drive-means and the said chuck for coupling and uncoupling the driving connection between the latter and the said drive-means; of power-driven chuck-operating means, including in combination: a jaw-operating motor; a jaw-operating spindle mounted both for rotary movement and reciprocating movement toward and away from the said chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with the said chuck; chuck-indexing means including an advanceable and retirable indexing-member and constructed and arranged to turn the said chuck into position for operative engagement by the said jaw-operating spindle; and automatic coordinating-means controlled by the said releasable clutch and constructed and arranged to prevent the advance of the said indexing-member until after the said clutch has been moved into its releasing position.

18. The combination with a machine having a rotatable chuck, drive-means for rotating the said chuck and a releasable clutch interposed between the said drive-means and the said chuck for coupling and uncoupling the driving connection between the latter and the said drive-means; of power-driven chuck-operating means, including in combination: a jaw-operating motor; a jaw-operating spindle mounted both for rotary movement and reciprocating movement toward and away from the said chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with the said chuck; chuck-indexing means including an advanceable and retirable indexing-member and constructed and arranged to turn the said chuck into position for operative engagement by the said jaw-operating spindle; electrically-controlled means controlling the advance of the said indexing-member; and automatic coordinating-means controlled by the said releasable clutch and an electric switch in turn controlling the said electrically-controlled means and associated with the said clutch, the said electric switch being constructed and arranged to prevent the advance of the said indexing-member until after the said clutch has been moved into its releasing position.

19. The combination with a machine having a rotatable chuck, drive-means for rotating the said chuck and releasable coupling-means interposed between the said drive-means and the said chuck for coupling and uncoupling the driving connection between the latter and the said drive-means; of power-driven chuck-operating means, including in combination: a jaw-operating motor; a jaw-operating spindle mounted both for rotary movement and reciprocating movement toward and away from the said chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with the said chuck; chuck-indexing means including an advanceable and retirable indexing-member and constructed and arranged to turn the said chuck into position for operative engagement by the said jaw-operating spindle; automatic co-ordinating-means controlled by the said releasable coupling-means and constructed and arranged to prevent the advance of the said indexing-member until after the said coupling-means has been moved into its releasing position; and second automatic coordinating-means controlled by the rotation of the said chuck and constructed and arranged to prevent the advance of the said indexing-member until after the said chuck has slowed down from its normal running speed.

20. The combination with a machine having a rotatable chuck, drive-means for rotating the said chuck and releasable coupling-means interposed between the said drive-means and the said chuck for coupling and uncoupling the driving connection between the latter and the said drive-means; of power-driven chuck-operating means, including in combination: a jaw-operating motor; a jaw-operating spindle mounted both for rotary movement and reciprocating movement toward and away from the said chuck; driving-means operatively connecting the said jaw-operating spindle to the said jaw-operating motor to cause the latter to rotate the former; spindle-advancing-and-retiring means constructed and arranged to axially move the said jaw-operating spindle into and out of operative engagement with the said chuck; chuck-indexing means including an advanceable and retirable indexing-member and constructed and arranged to turn the said chuck into position for operative engagement by the said jaw-operating spindle; automatic coordinating-means controlled by the said releasable coupling-means and constructed and arranged to prevent the advance of the said indexing-member until after the said coupling-means has been moved into its releasing position; and second automatic coordinating-means controlled by the said indexing-means and constructed and arranged to prevent the actuation of the said spindle - advancing - and - retiring means to advance the said jaw-operating spindle until after the said chuck has slowed down from its normal running speed.

HARRY E. SLOAN.
    HARRY E. SLOAN, Jr.
    LINWOOD B. SWANSON.

REFERENCES CITED

The following references are of record in the file of this patent:

UNITED STATES PATENTS

| Number | Name | Date |
|---|---|---|
| 1,650,693 | Cole | Nov. 29, 1927 |
| 2,211,722 | Groene et al. | Aug. 13, 1940 |
| 2,269,908 | Groene et al. | Jan. 13, 1942 |
| 2,418,149 | Addick et al. | Apr. 1, 1947 |
| 2,490,597 | Niederhiser | Dec. 6, 1949 |
| 2,507,241 | Bogart | May 9, 1950 |
| 2,515,329 | Bogart | July 18, 1950 |
| 2,529,772 | Highberg | Nov. 14, 1950 |